Nov. 24, 1953  H. B. MIDDENDORF  2,660,265
BRAKING CASTER
Filed Oct. 1, 1952

INVENTOR.
HENRY B. MIDDENDORF
BY
Brown, Critchlow, Flick & Peckham
HIS ATTORNEYS Patented Nov. 24, 1953

2,660,265

UNITED STATES PATENT OFFICE 2,660,265

BRAKING CASTER

Henry B. Middendorf, Pittsburgh, Pa., assignor to Scaffold Equipment Company, Pittsburgh, Pa., a corporation of Pennsylvania Application October 1, 1952, Serial No. 312,463

3 Claims. (Cl. 188—84)

This invention relates to braking casters, and more particularly to the type in which the position of the wheel in the fork is shifted to operate the brake.

Braking casters of this type have been sold, in which the wheel is journaled in a bracket that is pivoted in the caster fork in such a manner that the bracket can swing the wheel forward into the fork so that it will press against the front or top wall of the fork. The resulting friction between the wheel and fork is supposed to prevent rotation of the wheel. Nevertheless, wear of the wheel and fork may prevent them from pressing tightly enough together to effectively brake the caster.

It is among the objects of this invention to provide a braking caster of the shifting wheel type in which provision is made for compensating for wear, and in which the wheel will always be braked effectively.

In accordance with this invention, the fork which contains the caster wheel has an open back and open bottom between vertical side walls that are connected by a transverse wall at top and front. A bracket has a bifurcated body inside the fork where the opposite sides of the body are pivotally connected to the adjoining side walls of the fork. This bracket has an arm extending upward past the rear end of the transverse wall and in engagement with it to limit rotation of the bracket in that direction. A caster wheel projects into the fork and bracket body and is journaled in the body behind its pivotal connection to the fork. The lower part of the bracket body has a forward portion projecting a short distance in front of the wheel, and a braking member extends across the front of the wheel and is pivotally suspended on a horizontal axis from this portion. When the bracket arm is swung downward, it swings the wheel forward in the fork past the pivotal axis of the bracket, so that the transverse wall of the fork will press the braking member against the wheel to hold the wheel against rotation.

The preferred embodiment of the invention is illustrated in the accompanying drawings, in which Fig. 1 is a side view of my caster in running position;

Figure 1:
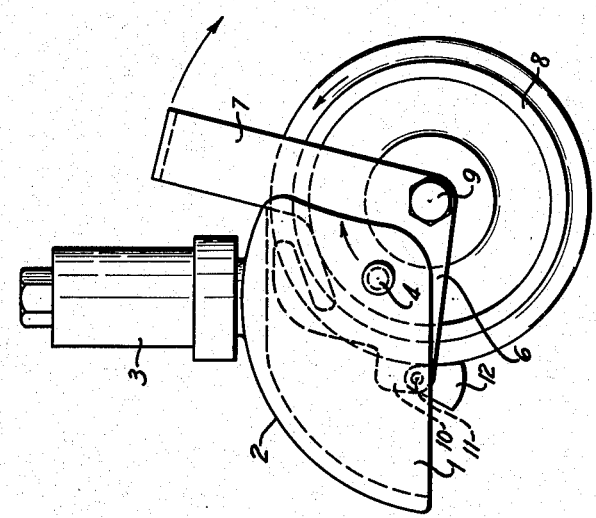

Referring to Fig. 1 of the drawings, a caster fork has spaced vertical side walls 1 connected only at their top and front by a longitudinally curved transverse wall 2, on top of which is mounted the usual spindle 3 for attaching the caster to the bottom of a scaffold or other device that is to be rolled from one location to another. The back and bottom of the fork are open. Near their lower rear corners, the side walls of the fork are provided with aligned openings in which a pair of rivets 4 are mounted. These rivets are located behind the vertical axis of the spindle. Pivotally mounted on these rivets are the opposite sides of the bifurcated body 6 of a bracket which projects from the back of the fork. The sides of the body are rigidly connected by an integral U-shaped arm 7 that extends upward from the top of the body and past the rear end of the transverse wall 2, which it engages in order to limit rotation of the bracket in one direction. This bracket straddles the wheel 8, preferably a rubber tired wheel, that is rotatably mounted on an axle 9 in the lower rear corner of the bracket directly behind the fork. Consequently, only about the upper front quarter segment of the wheel is straddled by the bracket and fork.

Figure 2:
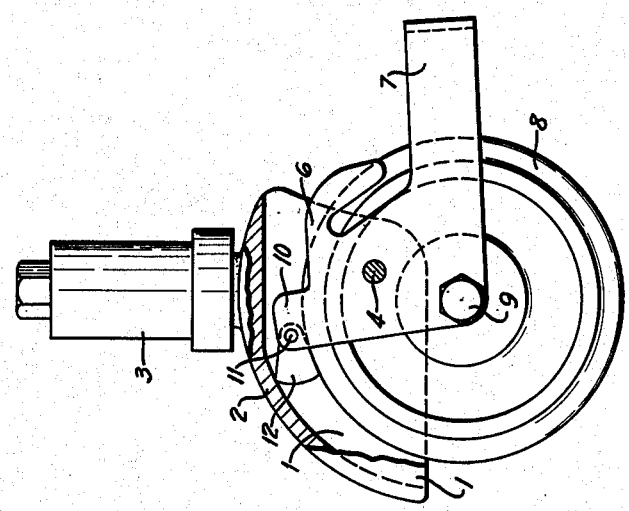
Fig. 2 is a side view of the caster in braked position, with the near side of the fork broken away.
Figure 4:
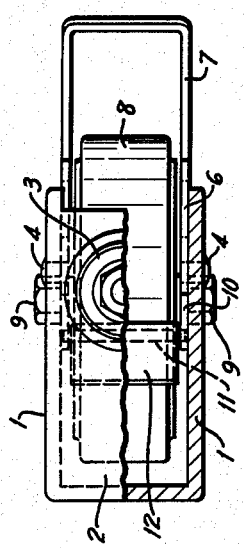
Fig. 4 is a plan view of the braked caster with part of the fork broken away.
Figure 3:
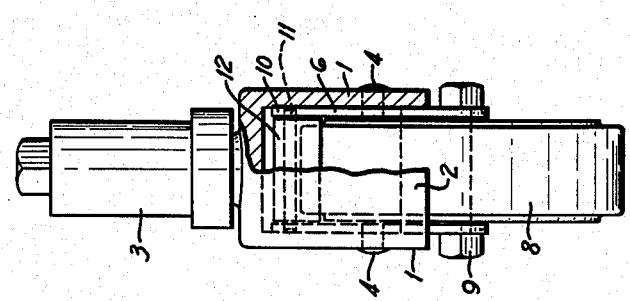
Fig. 3 is a front view of the braked caster, with part of the fork broken away.

It will be seen that if arm 7 is swung backward and down, it will rotate the bracket on rivets 4 and thus swing the wheel downward and forward in the fork. It is a feature of this invention that when this occurs, a brake is applied to the wheel. For this purpose, the bracket body has a pair of integral ears 10 near its bottom projecting forward a short distance beyond the wheel. These ears support a horizontal pivot pin 11 that extends across the wheel a short distance in front of it. Suspended from this pin is a braking member 12 that also extends across the wheel. This pendant member preferably is bell shape when viewed from the end; that is, it flares downwardly and has its rear surface slightly concave to fit the curvature of the wheel which it engages. As long as the wheel is in running position, it will slide down across the braking member without interference from it. However, when the wheel is swung forward into the fork by means of arm 7, the bracket simultaneously swings the braking member upward until it strikes the transverse wall 2 of the fork. This does not occur until after the axis of the wheel has been moved to a position in front of the pivotal axis of the bracket, as shown in Fig. 2, so that the weight on the caster will tend to swing the wheel farther forward and upward relative to the fork. This action pinches the braking member between the transverse wall 2 of the fork and the periphery of the wheel to prevent the wheel from rotating. In other words, the fork presses the curved rear side of the braking member tightly against the wheel, the downward pressure on the braking member being applied to it along its front lower edge. If the diameter of the wheel is reduced by wear, the fork merely moves downward on the wheel a corresponding amount and continues to press the braking member tightly against the wheel.

According to the provisions of the patent statutes, I have explained the principle of our invention and have illustrated and described what I now consider to represent its best embodiment. However, I desire to have it understood that, within the scope of the appended claims, the invention may be practiced otherwise than as specifically illustrated and described.

I claim:

1. A braking caster comprising a wheel, a fork straddling an upper front segment of the wheel and having a pair of vertical side walls connected only at top and front by a transverse wall, a bracket having a bifurcated body inside of said fork straddling the wheel, pivot means connecting the opposite sides of said body to the adjoining side walls of the fork, means rotatably mounting the wheel in the bracket body behind said pivot means, the bracket having a stop portion behind the fork engaging the back of the bracket, the lower part of the bracket body having a forward portion projecting a short distance in front of the wheel, and a braking member extending across the front of the wheel and pivotally suspended on a horizontal axis from said forward portion, said stop portion of the bracket being adapted to be swung downward to swing the wheel forward in the fork past said pivot means, whereby said transverse wall will press said braking member against the wheel to hold the wheel against rotation.

2. A braking caster comprising a wheel, a fork straddling an upper front segment of the wheel and having a pair of vertical side walls connected only at top and front by a transverse wall, a bracket having a bifurcated body inside of said fork straddling the wheel, pivot means connecting the opposite sides of said body to the adjoining side walls of the fork, means rotatably mounting the wheel in the bracket body behind said pivot means, the bracket having an arm extending upward past the rear end of said transverse wall in engagement therewith, the lower part of the bracket body having a forward portion projecting a short distance in front of the wheel, and a braking member extending across the front of the wheel and pivotally suspended on a horizontal axis from said forward portion, the rear surface of said member being concave and fitting against the wheel, said arm being adapted to be swung downward to swing the wheel forward in the fork past said pivot means, whereby said transverse wall will press the rear surface of said braking member against said wheel to hold the wheel against rotation.

3. A braking caster comprising a wheel, a fork straddling an upper front segment of the wheel and having a pair of vertical side walls connected only at top and front by a transverse wall, a bracket having a bifurcated body inside of said fork straddling the wheel, pivot means connecting the opposite sides of said body to the adjoining side walls of the fork, means rotatably mounting the wheel in the bracket body behind said pivot means, the bracket having an arm extending upward past the rear end of said transverse wall in engagement therewith, the lower part of the bracket body having a forward portion projecting a short distance in front of the wheel, a horizontal pivot pin mounted in said forward portion of the bracket, and a braking member extending across the front of the wheel and suspended by said pin, said member being tapered upwardly in transverse section, and said arm being adapted to be swung downward to swing the wheel forward in the fork past said pivot means, whereby said transverse wall will press against the lower front edge of said braking member and thereby press that member against the wheel to hold the wheel against rotation.

HENRY B. MIDDENDORF.

References Cited in the file of this patent

UNITED STATES PATENTS

| Number | Name | Date |
|---|---|---|
| 1,733,536 | Guitschula | Oct. 29, 1929 |
| 1,778,167 | Roe | Oct. 14, 1930 |
| 2,512,941 | Johnston | June 27, 1950 |